Patented Aug. 31, 1943

2,328,275

UNITED STATES PATENT OFFICE 2,328,275

CATALYTIC PROCESS FOR PURIFYING ETHYLENE

Joseph R. Heard, Jr., New York, N. Y., assignor, by mesne assignments, to Wyandotte Chemicals Corporation, Wyandotte, Mich., a corporation of Michigan No Drawing. Application June 22, 1939, Serial No. 280,525

11 Claims. (Cl. 260—663)

The present invention relates to an improved catalytic process for producing ethylene free from other unsaturates and to a catalyst therefor, and, more particularly, to an improved catalytic process for separating ethylene from its higher homologues contained in a mixture resulting from the cracking of petroleum oil and to a catalyst therefor.

In the manufacture of ethyl chloride, ethylene chlorohydrin, ethylene glycol, ethylene dichloride and many other industrial products, ethylene which is free from propylene and butylene is required or is desirable. Heretofore, commercially pure ethylene was obtainable only by very expensive methods. During the world war, commercially pure ethylene, a starting material for making mustard gas, was largely obtained by the dehydration of ethyl alcohol, an expensive raw material. More recently, ethylene was obtained from the gaseous mixture resulting from oil cracking processes of producing anti-knock gasoline by compressing and cooling the gases under a fractional liquefaction process. This process was similar to that for obtaining liquid air, so that, while the raw material used was inexpensive, the purification process was very expensive. Moreover, the process produced, as by-products, propylene and butylene, materials which are of little value, and it yielded an ethylene which was not of sufficient purity, as it is very difficult to separate ethylene from some of the saturated hydrocarbons as well as from its homologues, such as propylene. Attempts were made to separate ethylene from its higher homologues in gaseous mixtures by selective catalysis of the reaction between unsaturated hydrocarbons and hydrogen chloride. It was well known that the reaction between propylene and hydrogen chloride could be catalyzed by certain metallic chlorides, but these chloride catalysts had a very short life. For example, after 2 hours use, they usually were but half as efficient as they had been in the first few minutes, and this constituted a handicap. The prior art has long sought an inexpensive method of producing purified ethylene on an industrial scale, but, so far as I am aware, no satisfactory method has ever been discovered.

It is an object of the present invention to provide a selective catalytic process for obtaining ethylene from gases from oil cracking processes in a state substantially free from propylene and butylene.

It is another object of my invention to provide a process for separating ethylene from its higher homologues adaptable to easy, cheap and practicable production of said ethylene in relatively simple and inexpnsive apparatus.

It is also an object of my invention to provide a chemical method for the removal of propylene and butylene from a mixture of ethylene and these higher homologues thereof.

A further object of my invention is to provide an improved catalyst for removing from ethylene its higher homologues contained in a gaseous mixture resulting from the cracking of petroleum oil by reacting said higher homologues with hydrogen chloride gas.

It is also within the contemplation of this invention to provide an improved catalyst which will accelerate the reaction of the higher homologues of ethylene with hydrogen chloride without effect on ethylene.

My invention also contemplates providing an improved catalyst having a long life for the process of adding hydrogen chloride to propylene, which new catalyst is not readily poisoned.

Furthermore, my invention provides a method of converting propylene to isopropyl chloride, a valuable product.

Other objects and advantages will become apparent from the following description of a preferred procedure for carrying it into practice.

Broadly stated, my present invention contemplates an improved catalytic process which comprises passing the gaseous mixture resulting from petroleum oil cracking, containing ethylene and higher unsaturated homologues, together with hydrogen chloride gas in contact with or over an improved catalyst. This promotes the reaction of propylene and butylene with the hydrogen chloride to form alkyl chlorides but has no effect, or substantially no practical effect, on the ethylene present in the mixture. The proportion of ethylene to propylene in such mixtures is usually of the order of about 2:1. My research has demonstrated that, although the utilization of certain metallic chlorides as catalysts will accelerate the reaction between these higher homologues of ethylene and hydrogen chloride gas, greatly improved results are obtained by employing a mixed or double catalyst of a metallic chloride with an amine hydrochloride. This will so favor the desired reaction that isopropyl and isobutyl chlorides, etc., will be formed, and ethylene will be permitted to pass through unchanged. I have found that my double catalyst comprising a mixture of a metallic chloride with an amine hydrochloride in the ratio of approximately their respective molecular weights will, contrary to many of the statements made in the scientific and technical literature concerning the use of metallic chlorides alone, bring about the formation of isopropyl chloride substantially quantitatively from a mixture of propylene and ethylene, without reacting with an appreciable amount of the ethylene. These mixed catalysts, unlike those of the prior art, retain their high efficiency and do not decrease in catalytic efficiency with time. That is, after even several hours use, the efficiency of the catalyst is the same as it was in the first few minutes.

In practicing my invention I have discovered that the chlorides of the following metals may be used as the active element in my mixed catalyst: copper, zinc, cadmium, mercury, aluminum, titanium, tin, cerium, lead, vanadium, bismuth, chromium, manganese, iron, cobalt and nickel. Thus, zinc chloride, bismuth chloride and aluminum chloride have been found to be preferred and have given the most satisfactory results. I have also substituted activated aluminum oxide for aluminum chloride and have obtained good results, but it is my belief that aluminum oxide works because of its first forming aluminum chloride by reaction with the hydrogen chloride of the gaseous mixture.

As poisoning-inhibitors of my active catalytic element, I have found that ammonium chloride, substituted ammonium chlorides and the hydrochlorides of substituted ammonium hydroxides, including primary, secondary, and tertiary amine hydrochlorides of aliphatic and aromatic compounds, and quaternary ammonium compounds may be used. Methylamine hydrochloride, hydroxylamine hydrochloride, the hydrochlorides of dimethylamine, diethylamine, trimethylamine, triethylamine, ethylenediamine, ethanolamines, and pyridine, and in general other hydrochlorides of primary, secondary, and tertiary amines of aliphatic and aromatic hydrocarbons, substituted amine hydrochlorides, and hydrochlorides of heterocyclic amines are also effective. I do not, however, intend to cover by the terms "substituted ammonium chloride" and "substituted ammonium hydroxides" any nitrogen compounds of the types of nitriles, isocyanides or amides, none of which is commonly so classified. It will be noted that the foregoing are all basic amines which readily form hydrochlorides. When ammonium chloride is used, I have found that it requires about 2 mols of ammonium chloride for each mol of the metallic chloride for it to be equally as effective as other amine hydrochlorides at a mol ration of 1:1.

An excess of the added nitrogen salt serves to overprotect the primary catalyst and therefore slow down the reaction. Accordingly, an excess of either ammonium chloride or amine hydrochloride has to be avoided. However, in large scale operations, it is sometimes advantageous to overprotect the first part of the catalyst to be in contact with the gaseous mixture in order to extend the amount of surface of the catalyst and so to regulate the amount of heat evolved, until enough isopropyl chloride is formed to serve as a diluent. This then acts as a cooling agent for the last part of the reaction. Since the process evolves considerable amounts of heat, once started, it may be accordingly made to take care of its own heat requirements, provided that prior insulation of the catalyst chamber is employed.

I have found that my process is most successful at a temperature of about 50° to about 150° C., and I prefer to operate at the upper part of this range, say, at about 125° C. Butylene reacts like propylene but at lower temperatures, and ethylene is, of course, non-reacting and passes through the catalyst without change, thus permitting the process to be used as a method of freeing gas mixtures from higher unsaturated hydrocarbons and leaving the ethylene unchanged.

The process can be operated at either atmospheric or increased pressures, but I have found it advantageous to use pressures above atmospheric.

In carrying out my process in the vapor phase, I prefer to support the catalyst on a carrier of the customary type, for example, silica gel, aluminum oxide, or adsorbent carbon. It is my belief that any inert carrier would serve, except that the carrier should be one having fine pores, as in the illustrations mentioned. I prefer to use one part of the catalytic mixture with about 10 parts of the carrier, but I have employed both lower and higher proportions successfully.

With about 1:1 molar proportions of hydrochloric acid gas and unsaturated hydrocarbons, other than ethylene, the yield of alkyl chloride exceeds 95%, and the same holds true for the minor constituent when an excess of either reacting material is used.

My double-chloride catalysts have the advantages that they are substantially unpoisoned with use, do not polymerize or decompose propylene or butylene to form tarry materials, and hold their activity indefinitely. One of the functions of the poison-inhibiting elements therein is to prevent decomposition of the hydrocarbons and consequent deposition of the carbon upon the catalysts.

Although I prefer to operate my process in the vapor phase, nevertheless satisfactory results are obtainable where the mixture of gases is dissolved in a solvent. However, a longer time of contact is needed for such operation. This solvent or liquid phase modification is particularly advantageous where it is desired to make isopropyl chloride from propylene or from a mixture rich in propylene. Indeed, the isopropyl chloride itself can be used as the liquid solvent if under sufficient pressure to permit a temperature of about 75° C. In this operation, a catalyst such as aluminum chloride with diethylene amine hydrochloride may be employed.

For the purpose of giving those skilled in the art a better understanding of my present invention, the following descriptions of illustrative examples of carrying the invention into practice are given:

*Example No. I*

A gaseous mixture containing about 300 parts by volume of ethylene and propylene in a ratio of about 2:1 is passed together with about 125 parts of hydrogen chloride gas at about 125° C. and at the rate of about 0.75 cubic feet per hour through a glass tube of about ¾ inch diameter. The cross section area of the tube is filled for a length of about 4 feet with a catalyst comprising zinc chloride and ammonium chloride, in the proportion of about 1 mol of zinc chloride to two of ammonium chloride, deposited upon silica gel. About 1 part of the catalytic mixture is used for 10 parts of silica gel. This gives a yield of isopropyl chloride of about 95% of the yield theoretically obtainable, with substantially no effect on the ethylene, and this efficiency is not decreased after many hours use of the catalyst.

*Example No. II*

The same procedure is followed in this example as in Example No. I, except that, to the gaseous mixture passed over my improved catalyst, about 30% as much steam by volume as hydrogen chloride is added. The yield on a space velocity basis is substantially the same as in Example No. I, but liquid water is, of course, condensed with the isopropyl chloride.

*Example No. III*

To about 150 parts of a mixture of saturated and unsaturated gaseous hydrocarbons, obtained from the cracking of petroleum and containing about 32 parts ethylene and about 20 parts propylene, about 25 parts of hydrogen chloride is added. The resulting mixture of gases is passed at the rate of about 10 cubic feet per hour through a hot catalyst comprising a 1:1 molar mixture of zinc chloride and diethylamine hydrochloride deposited upon porous alumina. The catalyst is contained in a reactor tube of about 2 inches diameter and about 5 feet long and kept at a temperature of about 100° C. About 96% of the propylene is converted to isopropyl chloride with substantially no loss of ethylene.

Although my invention is described in connection with preferred embodiments, it will be observed that variations may be restorted to and are within the purview of the appended claims. For example, in the gases obtained in cracking petroleum for gasoline manufacture, traces of butadiene and other hydrocarbon impurities which are very sensitive and too easily reacted are sometimes present. These are removed, either by passing the gases through a vessel carrying adsorbent carbon or by treating them with a small amount of chlorine to change them into non-reactive materials, and after this preliminary purification the gas mixture is subjected to my process.

I claim:

1. The process for separating ethylene from its higher homologues including propylene and butylene which comprises reacting the higher homologues of ethylene contained in a hydrocarbon gas mixture also containing ethylene at about 100° C. to about 150° C. with hydrogen chloride in the presence of a catalyst comprising essentially a solid mixture of at least one metal chloride and a poison-inhibiting substance selected from the group consisting of ammonium chloride and amine hydrochlorides to leave the ethylene substantially unaffected, and separating ethylene from the products of said reaction, whereby ethylene substantially free from other unsaturates is produced.

2. The process for separating ethylene from its higher homologues which comprises passing hydrogen chloride gas together with a gaseous mixture containing unsaturated hydrocarbons including ethylene and its higher homologues including propylene and butylene in the ratio of about 1 part of hydrogen chloride gas to about 1 part of the propylene content of the gaseous mixture at a temperature of about 125° C. through a chamber containing a catalyst comprising essentially a mixture of a metal chloride and a hydrochloride of a basic amine deposited upon a carrier having fine pores thereby reacting the higher homologues of ethylene but leaving the ethylene substantially unreacted, and removing ethylene therefrom, whereby ethylene substantially free from other unsaturates is produced.

3. In the process for separating ethylene from a hydrocarbon gas mixture, that improvement which comprises heating hydrogen chloride gas together with a gaseous mixture containing unsaturated hydrocarbons including ethylene and its higher homologues including propylene and butylene to a temperature of about 100° to about 150° C. in the presence of a catalyst comprising essentially a mixture of a metal chloride and a hydroxylamine hydrochloride, thereby reacting said higher homologues of ethylene to form alkyl chlorides and leaving the ethylene substantially unreacted.

4. In the catalytic process for separating ethylene from a hydrocarbon gas mixture, that improvement which comprises heating hydrogen chloride gas together with a gaseous mixture containing unsaturated hydrocarbons including ethylene and its higher homologues including propylene and butylene in the presence of a catalyst comprising essentially a mixture of a metal chloride and a substituted amine hydrochloride, whereby the higher homologues of ethylene are reacted and the ethylene is substantially unaffected.

5. In the process for separating ethylene from a hydrocarbon gas mixture, that improvement which comprises heating a mixture of hydrogen chloride gas and steam together with a gaseous mixture containing unsaturated hydrocarbons including ethylene and its higher homologues including propylene and butylene in the presence of a catalyst comprising essentially a mixture of a metal chloride and a substituted amine hydrochloride deposited upon silica gel, thereby reacting the higher homologues of ethylene and leaving the ethylene substantially unchanged.

6. The process for separating ethylene from other olefines including propylene and butylene which comprises heating a hydrocarbon gas mixture containing ethylene and other olefines with hydrogen chloride in the presence of a catalyst comprising essentially a mixture of a metal chloride and an amine hydrochloride thereby reacting said other olefines to form alkyl chlorides and leaving the ethylene substantially unaffected, and removing ethylene therefrom, whereby ethylene substantially free from other unsaturates is produced.

7. The process for selectively producing chlorides of members of the olefine series of hydrocarbons having more than two carbon atoms in the molecule which comprises heating a hydrocarbon gas mixture containing ethylene and other olefines including propylene and butylene with hydrogen chloride in the presence of a catalyst comprising essentially a mixture of a metal chloride and an amine hydrochloride, and removing the chlorides of said other olefines therefrom.

8. The process for producing isopropyl chloride which comprises passing a mixture of propylene and hydrogen chloride in the ratio of about 1:1 at a temperature of about 100° C. through a chamber, there subjecting said mixture to the catalytic effect of a solid mixture of a metal chloride and a hydrochloride of a basic amine deposited upon a carrier having fine pores, and recovering isopropyl chloride therefrom.

9. The process for separating ethylene from its higher homologues including propylene and butylene which comprises reacting the higher homologues of ethylene contained in a hydrocarbon gas mixture including ethylene at about 100° C. to about 150° C. with hydrogen chloride in the presence of a catalyst comprising essentially a mixture of a metal chloride and a substituted amine hydrochloride deposited upon a carrier having fine pores to leave the ethylene substantially unaffected, and separating ethylene from the products of said reaction, whereby ethylene substantially free from other unsaturates is produced.

10. The process for separating ethylene from its higher homologues including propylene and butylene which comprises reacting the higher homologues of ethylene contained in a hydrocarbon gas mixture including ethylene at about 100° C. to about 150° C. with hydrogen chloride in the presence of a catalyst comprising essentially a mixture of a metal chloride and a hydroxylamine hydrochloride deposited upon a carrier selected from the group consisting of silica gel, aluminum oxide and adsorbent carbon to leave the ethylene substantially unaffected, and separating ethylene from the products of said reaction, whereby ethylene substantially free from other unsaturates is produced.

11. The process for separating ethylene from its higher homologues which comprises passing hydrogen chloride gas together with a gaseous mixture containing unsaturated hydrocarbons including ethylene and its higher homologues including propylene and butylene in the ratio of about 1 part of hydrogen chloride gas to about 1 part of the propylene content of the gaseous mixture at a temperature of about 125° C. through a chamber containing a catalyst comprising essentially a mixture of zinc chloride and ammonium chloride in the ratio of about 1 mol of zinc chloride to about 2 mols of ammonium chloride deposited upon about 10 parts of silica gel to about 1 part of the catalytic mixture thereby reacting the higher homologues of ethylene to form alkyl chlorides but leaving the ethylene substantially unreacted, and removing ethylene therefrom, whereby ethylene substantially free from other unsaturates is produced.

JOSEPH R. HEARD, JR.